United States Patent [19]
Shimizu

[11] Patent Number: 5,446,526
[45] Date of Patent: Aug. 29, 1995

[54] DEVELOPING DEVICE HAVING A DEVELOPER TRANSPORT ROLLER WITH A MAGNETIC FIELD DISTRIBUTION THAT ELIMINATES STREAKING AND FOGGING

[75] Inventor: Tamotsu Shimizu, Settsu, Japan

[73] Assignee: Minolta Camera Kabushiki Kaisha, Osaka, Japan

[21] Appl. No.: 271,784

[22] Filed: Jul. 7, 1994

[30] Foreign Application Priority Data

Jul. 8, 1993 [JP] Japan .................................. 5-168884

[51] Int. Cl.$^6$ ............................................ G03G 15/09
[52] U.S. Cl. ..................................... 355/251; 118/658
[58] Field of Search ............................... 355/251, 253; 118/656–658; 430/122

[56] References Cited

U.S. PATENT DOCUMENTS

| | | | |
|---|---|---|---|
| 4,492,456 | 1/1985 | Haneda et al. ................. | 118/657 X |
| 5,129,357 | 7/1992 | Yamaji ............................. | 118/658 |
| 5,212,525 | 5/1993 | Noami et al. ................... | 355/251 |

*Primary Examiner*—William J. Royer
*Attorney, Agent, or Firm*—Burns, Doane, Swecker & Mathis

[57] ABSTRACT

A developing device includes a movable sleeve confronting a photosensitive member at a first point. A magnet member provided within the sleeve produces a magnetic force to maintain developer on an external surface of the sleeve, with the developer being transported in accordance with movement of the sleeve. A regulation member confronts the external surface of the sleeve at a second point to regulate the thickness of the developer on the external surface of the sleeve. This second point is upstream of the first point with respect to the direction of developer transportation. A distribution curve of the radial magnetic force produced by the magnet member has a peak point in an area between the first point and the second point, and first and second inflection points in this area on the same side of the peak point with respect to the direction of developer distribution. The first inflection point is nearer to the peak point than the second inflection point.

9 Claims, 8 Drawing Sheets

DEVELOPING DEVICE HAVING A DEVELOPER TRANSPORT ROLLER WITH A MAGNETIC FIELD DISTRIBUTION THAT ELIMINATES STREAKING AND FOGGING

BACKGROUND OF THE INVENTION

1. Field of the Invention

The present invention relates to a developing device for copiers and printers and the like, wherein an electrostatic latent image formed on an image-carrying member is developed by toner.

2. Description of the Related Art

A conventional developing device is shown in FIG. 10. In the developing device 1a, the developing roller 4 includes a rotatable sleeve 6 as an external housing installed over a non-rotating stationary magnet roller 5, and is accommodated in an open portion 3 formed in housing 2 confronting the photosensitive member 12, and a regulating member 7 is arranged opposite the sleeve 6 to provide a fine gap of predetermined size on the top exterior surface thereof. Magnetic poles S1, N1, S2, N2, S3, N3, S4 which extend in the axial direction are sequentially formed on the exterior circumference of the magnet roller 5 along the direction of rotation of said sleeve (clockwise direction in the drawing), such that the magnetic pole S1 is disposed opposite the regulating member 7, and magnetic pole S2 is disposed opposite the photosensitive member 12. Magnetic fields are formed on the exterior surface of the sleeve 6 via the aforesaid magnetic poles S1~S4, and the vertical magnetic force Br of said magnetic fields is distributed so as to peak above the center of said magnetic poles, respectively, as shown in FIG. 11. The reference label "G" in FIG. 11 refers to Gauss units of magnetic force, and is used throughout the following description.

In the developing device 1a of the previously mentioned construction, a developer 10, comprising a carrier and a toner accommodated in a developer reservoir 8, is supplied to the developing roller 4 via the supply roller 9. The developer 10 supplied to the developing roller 4 is maintained on the exterior surface of the sleeve 6 by means of the magnetic force of the magnetic pole S1. The developer 10 is transported in a clockwise direction in conjunction with the rotation of the developing sleeve 6, and after the amount of transported toner is adjusted by means of the regulating member 7, said toner is supplied to the electrostatic latent image formed on the surface of the photosensitive member 12 in the area confronting said photosensitive member 12, thereby rendering the image visible. The developer 10 which passes the area opposite the photosensitive member 12 continues to be transported in a clockwise direction, and is released from the magnetic force of the magnet roller 5 at a location past the area opposite the magnetic pole S4, whereupon said toner is collected in the developer reservoir 8. On the other hand, the toner which was supplied to the photosensitive member 12 is transferred onto a transfer member such as a paper sheet or the like at a transfer area not shown in the illustration, thereby forming an image thereon.

Another well known developing device is shown in FIG. 12. In the developing device 1b, magnetic poles S1, N1, N2, S2, N3, N4, S3 are sequentially formed on the exterior circumference of the magnet roller 5 along the direction of rotation of said sleeve, such that the magnetic pole S1 is disposed opposite the regulating member 7, and magnetic pole S2 is disposed opposite the photosensitive member 12, and magnetic poles N1 and N2 having the same polarities are arranged medially to said magnetic poles S1 and S2. Furthermore, magnetic fields are formed on the exterior surface of the sleeve 6 via the aforesaid magnetic poles S1~S3, and the vertical magnetic force Br of said magnetic fields is distributed as shown in FIG. 13. In other respects the construction of the present device is identical to that of the previously described developing device 1a, and, therefore, like parts are designated by like reference numbers and further description is omitted.

In the developing device 1b, after the amount of the developer 10 which has been supplied to the sleeve 6 is adjusted by means of the regulating member 7, and when said developer 10 arrives at the area opposite the magnetic pole N1, it is regulated by a repulsive magnetic field (refer to FIG. 14) formed by the magnetic poles N1 and N2, such that a collection of developer 10 is formed in the area opposite the magnetic pole N1. The collected developer 10 is pushed out by subsequently transported developer 10, becomes airborne in the area confronting the magnetic pole N2, and is again maintained on the surface of the sleeve 6 so as to be transported in a clockwise direction (refer to FIG. 15). The developer 10 is disturbed at the aforesaid collecting area, and not only travels in the direction of rotation of the sleeve 6, but also travels in the axial direction of said sleeve 6. Accordingly, when foreign particles congregate in the gap formed between the sleeve 6 and the regulating member 7 such that areas lacking developer 10 are produced on the surface of the sleeve 6, the developer on the periphery of the previously mentioned collection of developer 10 is supplied to said areas lacking developer 10, thereby eliminating said areas lacking developer 10 and preventing white streaks on the image.

However, the developing device 1a has certain disadvantages inasmuch as when large diameter foreign particles such as toner clumps, masses and the like contained in the developer 10 become lodged between the sleeve 6 and the regulating member 7, said foreign matter excludes the developer 10, such that white streaks caused by a lack of adhered toner appear on those portions of the image at corresponding locations.

Furthermore, the developing device 1b has certain disadvantages inasmuch as the developer 10 is airborne between the area confronting the magnetic pole N1 and the area confronting the magnetic pole N2, such that some of the airborne developer 10 is dispersed in the vicinity, whereupon said dispersed developer 10 may adhere to the surface of the photosensitive member 12, thereby producing fog on the image and soiling the surrounding components.

SUMMARY OF THE INVENTION

An object of the present invention is to provide a developing device capable of reproducing high quality images.

Another object of the present invention is to provide a developing device which does not produce white streaks on the image, and does not cause airborne dispersion of the developer nor image fog or component soiling associated with said developer dispersion.

These and other objects of the present invention are accomplished by providing a developing device comprising:

a movable sleeve confronting an electrostatic latent image carrier at a first point;

a magnet member provided within said sleeve, with the magnetic force produced by said magnet member maintaining developer on an external surface of said sleeve, said developer being transported in accordance with movement of said sleeve;

a regulation member confronting the external surface of said sleeve at a second point to regulate a thickness of the developer on the external surface of said sleeve, said second point being upstream of said first point with respect to a direction of developer transportation, with the distribution curve of vertical magnetic force produced by said magnet member having a peak point in an area between said first and second points, and first and second inflection points in said area and at a same side of said peak point with respect to the direction of developer transportation, said first inflection point being nearer to said peak point than said second inflection point, wherein said developing device satisfies the following equations:

$$(M_{IF2}/M_{IF1}) < 0.8$$

$$(M_{IF2}/M_{IF1}) > 0.015\Phi$$

wherein $M_{IF1}$ represents a vertical magnetic force at said first inflection point, $M_{IF2}$ represents a vertical magnetic force at said second inflection point, and $\Phi$ represents the central angle between said first and second inflection points (units: degrees).

In the present invention, the inflection point is defined as a point at which the value of the second derivative of Br with respect to the central angle $\Phi$ is 0 $[(\partial Br^2/\partial^2\Phi) = 0]$.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
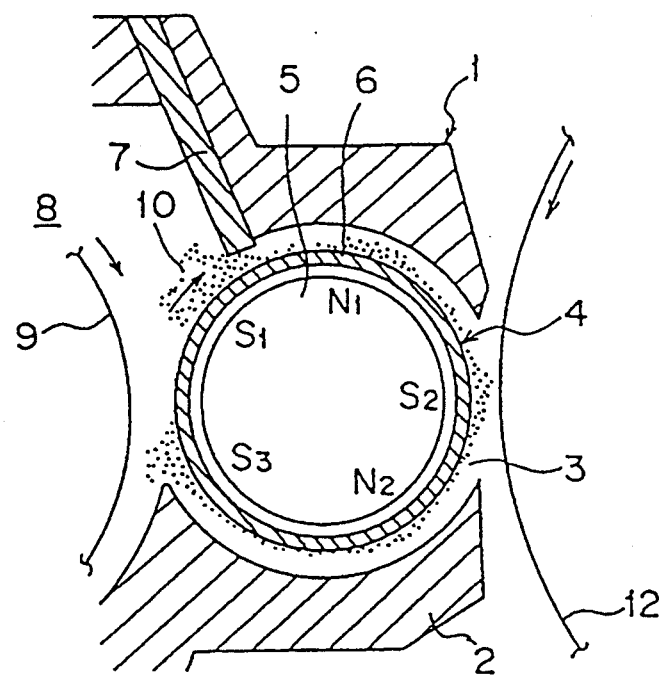
FIG. 1 is a section view showing the main portion of the developing device of the present invention.

The preferred embodiments of the present invention are described hereinafter with reference to the accompanying drawings. FIG. 1 shows the developing device of the present invention. Magnetic poles S1, N1, S2, N2, S3 are sequentially formed on the exterior circumference of the magnet roller 5 along the direction of rotation of sleeve 6, and the pole S1 confronts the regulating member 7, pole S2 confronts the photosensitive member 12, pole N1 is disposed medially to poles S1 and S2, and pole S3 is disposed medially to poles N2 and S1. The magnetic forces of the poles S1, N1, S2, N2, S3 are such that the vertical magnetic forces Br formed by said magnetic poles are steady and express the distribution indicated by the solid line in FIG. 2.

That is, the peaks of the magnetic forces Br are respectively formed at the areas confronting the poles S1, N1, S2, N2, S3, and said magnetic forces are 420 G, 760 G, 880 G, 770 G, and 550 G, respectively (G:Gauss). The distribution curve of the vertical magnetic force Br formed at the area confronting pole N1 shows a shoulder area Ms formed on the downstream side of the magnetic force peak $M_{max}$ of the vertical magnetic force Br, with two inflection points IF1 and IF2.

Figure 2:
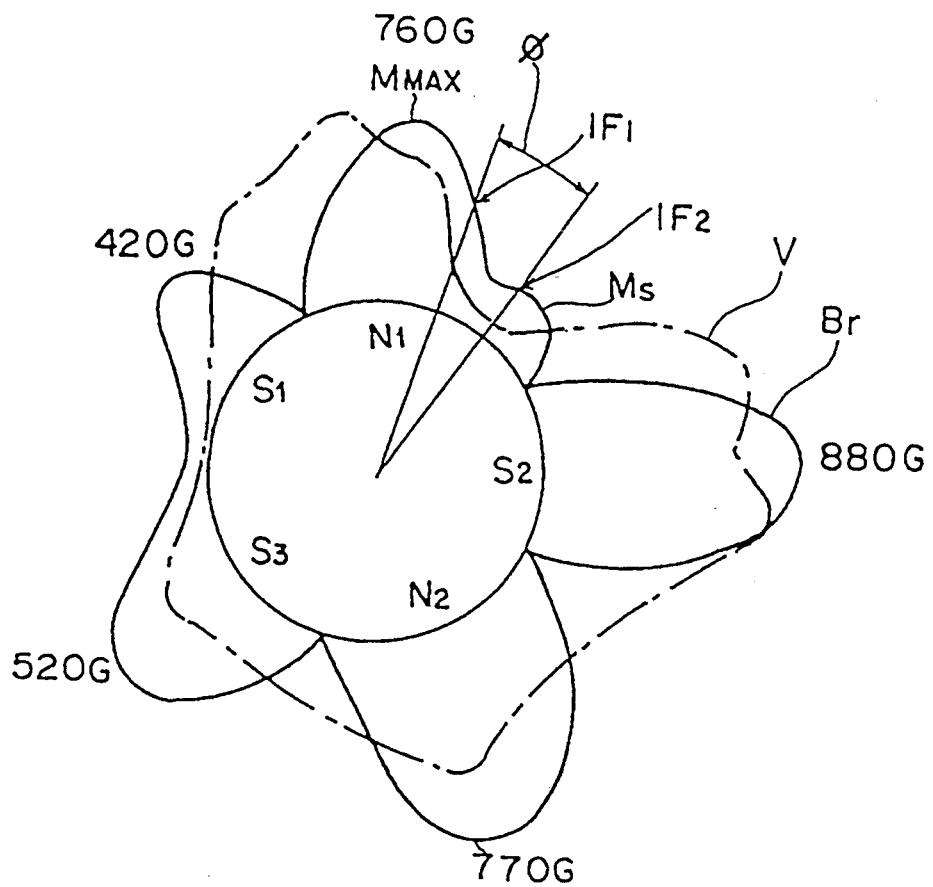
FIG. 2 is an illustration showing the distribution of magnetic force on the sleeve of the developing device of FIG. 1.

In other respects the construction of the developing device 1 is identical to the previously described developing device 1a, and like parts are designated by like reference number, and further description is omitted herefrom. In FIG. 2, the dashed line is a distribution curve of the force drawing the developer on the surface (hereinafter referred to as "magnetic attraction force V") produced by the magnetic poles S1, N1, S2, N2, S3.

The effects of the positional relationship of both vertical magnetic forces Br at the inflection points IF1 and IF2 on developer transportability are described hereinafter. The vertical magnetic force Br and the magnetic attraction force V are related such that the magnetic attraction force becomes smaller as the vertical magnetic force Br or the rate of change of the vertical magnetic force becomes smaller. As shown in FIG. 2, the distribution curve of the vertical magnetic force Br of the magnetic pole N1 has a shoulder Ms on the downstream side of the peak magnetic force $M_{max}$, and the change in the vertical magnetic force Br is moderate, such that the magnetic attraction force tends to be reduced from the vicinity of the inflection point IF1 in the area confronting the pole N1.

Figure 3:
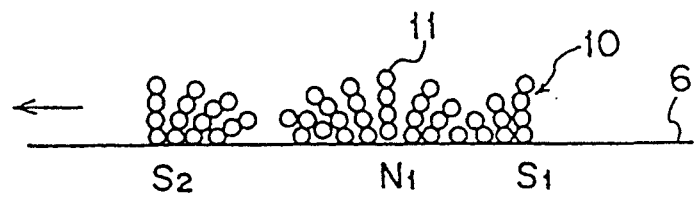
FIG. 3 is an illustration showing the state of movement of the developer on the sleeve.

Accordingly, the developer 10 being transported from the inflection point IF1 to the inflection point IF2 in conjunction with the rotation of the sleeve 6 is attracted toward said inflection point IF1. That is, the developer transport action via the rotation of the sleeve 6 and the magnetic attraction force in the opposite direction to said transport direction both act upon and disturb the developer 10. When the ratio of the magnetic force $M_{IF2}$ of the downstream inflection point IF2 to the magnetic force $M_{IF1}$ of the upstream inflection point IF1 ($M_{IF2}/M_{IF1}$ (hereinafter referred to as "inflection point force ratio $\alpha$")) is large, the developer 10 which has passed in the vicinity of the inflection point IF1 is strongly attracted by the magnetic force in the vicinity of the inflection point IF2 and becomes airborne. Accordingly, the inflection point force ratio $\alpha$ must be set to a certain low value so as to transport the developer 10 while maintaining said developer 10 on the surface of the sleeve 6. In the developing device of the present invention, the inflection point force ratio $\alpha$ is set so as to gradually reduce the magnetic attraction force from the first inflection point IF1 to the second inflection point IF2, such that the developer 10 which has passed the area confronting the magnetic pole N1 is moved from said pole N1 toward the pole S2 in a state wherein said developer 10 forms a magnetic brush 11 which is maintained on the surface of the sleeve 6, as shown in FIG. 3. That is, the developer 10 is moved from the area confronting the magnetic pole N1 toward the area confronting the magnetic pole S2 without becoming airborne.

Figure 4:
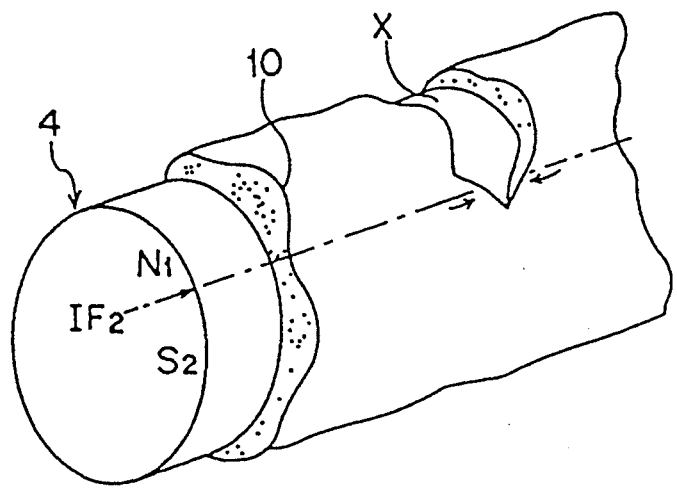
FIG. 4 is a perspective view of the developing roller showing the conditions of white streak elimination of the developing device.
Figure 5:
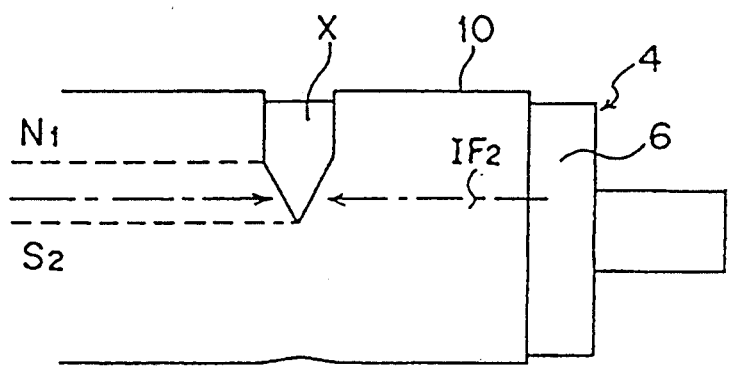
FIG. 5 is a front view of the developing roller showing the conditions of white streak elimination of the developing device.

The vertical magnetic force is reduced in proximity to the inflection point IF2, such that the magnetic attraction force becomes weaker due to the slight change in the vertical magnetic force, and the developer 10 readily moves in the axial direction on the surface of the sleeve 6 Thus, as shown in FIGS. 4 and 5, when foreign matter becomes lodged between the regulating member 7 and the sleeve 6 so as to produce a developer-lacking region X on the downstream side thereof, developer 10 is supplied to said developer-lacking region X from both sides in the vicinity of the inflection point IF2, thereby eliminating said developer-lacking region X, and preventing the generation of white streaks. In order to supply developer 10 bilaterally to the developer-lacking region X, the small range of change in the magnetic force in the vicinity of the inflection point IF2 must be maintained at or above a certain width, since the developer 10 becomes airborne when said width becomes too narrow. Furthermore, when the magnetic force at the inflection point IF2 is too weak, the force which moves the developer 10 in the axial direction while transporting said developer 10 downstream is also weakened, thereby reducing the ability to eliminate white streaks. In other words, in order to eliminate white streaks, the spacing between the inflection points IF1 and IF2 must be at or greater than a certain width, such that the inflection point force ratio $\alpha$ ($M_{IF2}/M_{IF1}$) must be set at a value larger than a certain value.

From the above perspective, therefore, experiments were conducted to ascertain the ability to eliminate airborne developer and eliminate white streaks when the magnetic force $M_{IF1}$ of the first inflection point IF1, the magnetic force $M_{IF2}$ of the second inflection point IF2, and the central angles $\Phi$ of the inflection points IF1 and IF2 were variously modified, and the amount of transported developer (i.e., amount of developer per unit area on the surface of the developing roller 4) was varied at 50 mg/cm$^2$ and 40 mg/cm$^2$. The ability to eliminate airborne developer was determined by observing the conditions of developer transport between the first inflection point IF1 and the second inflection point IF2. The ability to eliminate white streaks was determined by observing the conditions for generating white streaks by using an image forming apparatus to produce solid images by having a 2 mm wide film mounted on the regulating member 7 come into contact with the exterior surface of the sleeve 6. The ability to achieve the aforesaid eliminations was evaluated from better to worse in four rankings using the following symbols: ⊚, ○, △, X, and an overall evaluation combining the aforesaid to elimination abilities was evaluated from better to worse in five rankings using the following symbols: A, B, C, D, E.

Figure 6:
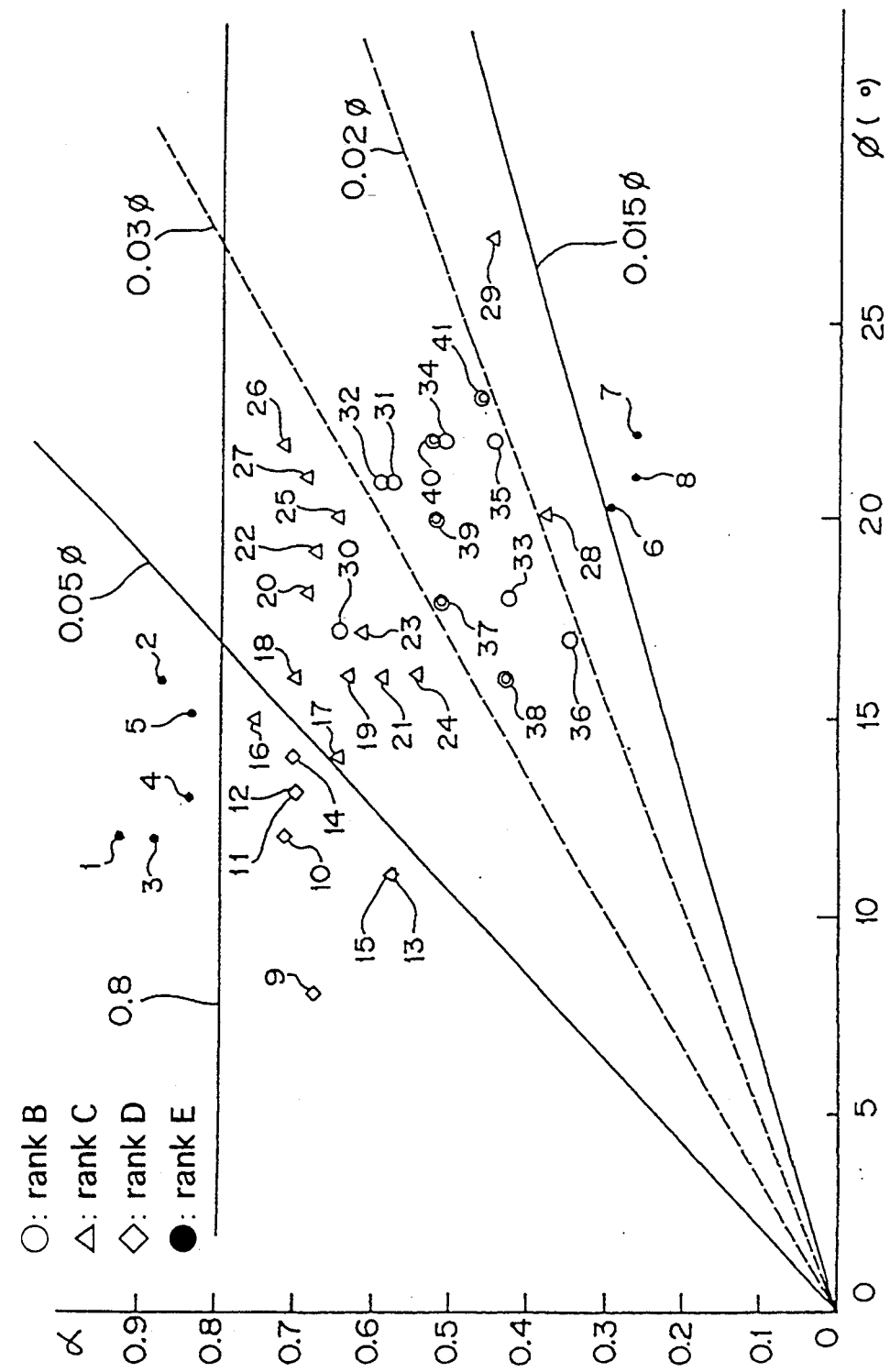
FIG. 6 is an illustration showing the relationship between the magnetic force ratio and the central angle.

The experimental conditions (Magnetic force $M_{IF1}$, $M_{IF2}$, central angle $\Phi$, inflection point force ratio $\alpha$, and magnetic force variation ratio $\beta$ (=$\alpha/\Phi$) and results are shown in Tables 1 through 5, respectively. FIG. 6 shows a graph with the experimental symbols plotted and wherein the central angles of the first and second inflection points IF1 and IF2 are entered on the horizontal axis, and the inflection point force ratio $\alpha$ is entered on the vertical axis. In the graph, the lines ($\alpha=0.8\Phi$, $\alpha=0.015\Phi$, $\alpha=0.02\Phi$, $\alpha=0.03\Phi$, $\alpha=0.05\Phi$) indicate the grouped experiments for each overall evaluation.

TABLE 1

| Symbol | $M_{IF1}$ | $M_{IF2}$ | $\phi$ | $\alpha$ | $\beta$ | 50 mg/cm$^2$ white streak elimination | 50 mg/cm$^2$ airborne developer | 40 mg/cm$^2$ white streak elimination | 40 mg/cm$^2$ airborne developer | Overall |
|---|---|---|---|---|---|---|---|---|---|---|
| 1 | 280 | 260 | 12 | 0.93 | 0.078 | ○ | X | ○ | X | E |
| 2 | 420 | 370 | 16 | 0.88 | 0.055 | ○ | X | ○ | X | E |
| 3 | 530 | 460 | 12 | 0.87 | 0.073 | ○ | X | ○ | X | E |
| 4 | 380 | 320 | 13 | 0.84 | 0.065 | ○ | X | ○ | X | E |
| 5 | 360 | 300 | 15 | 0.83 | 0.055 | ○ | X | ○ | X | E |
| 6 | 475 | 145 | 20 | 0.30 | 0.015 | X | ○ | X | ○ | E |
| 7 | 350 | 90 | 22 | 0.26 | 0.012 | X | ○ | X | ○ | E |
| 8 | 300 | 70 | 21 | 0.23 | 0.011 | X | ○ | X | ○ | E |

TABLE 2

| Symbol | $M_{IF1}$ | $M_{IF2}$ | $\phi$ | $\alpha$ | $\beta$ | 50 mg/cm² white streak elimination | 50 mg/cm² airborne developer | 40 mg/cm² white streak elimination | 40 mg/cm² airborne developer | Overall |
|---|---|---|---|---|---|---|---|---|---|---|
| 9 | 400 | 270 | 8 | 0.68 | 0.085 | ○ | ○ | ○ | X | D |
| 10 | 340 | 240 | 12 | 0.71 | 0.059 | ○ | ○ | ○ | X | D |
| 11 | 330 | 230 | 13 | 0.70 | 0.054 | ○ | ○ | ○ | X | D |
| 12 | 400 | 280 | 13 | 0.70 | 0.054 | ○ | ○ | ○ | X | D |
| 13 | 280 | 160 | 11 | 0.57 | 0.052 | ○ | ○ | ○ | X | D |
| 14 | 400 | 280 | 14 | 0.70 | 0.050 | ○ | ○ | ○ | X | D |

TABLE 3

| Symbol | $M_{IF1}$ | $M_{IF2}$ | $\phi$ | $\alpha$ | $\beta$ | 50 mg/cm² white streak elimination | 50 mg/cm² airborne developer | 40 mg/cm² white streak elimination | 40 mg/cm² airborne developer | Overall |
|---|---|---|---|---|---|---|---|---|---|---|
| 15 | 320 | 180 | 11 | 0.57 | 0.052 | ○ | ○ | ○ | △ | C |
| 16 | 520 | 390 | 15 | 0.75 | 0.050 | ○ | ○ | ○ | △ | C |
| 17 | 400 | 260 | 14 | 0.65 | 0.046 | ○ | ○ | ○ | △ | C |
| 18 | 400 | 280 | 16 | 0.70 | 0.044 | ○ | ○ | ○ | △ | C |
| 19 | 380 | 240 | 16 | 0.63 | 0.039 | ⊙ | ○ | ○ | △ | C |
| 20 | 440 | 300 | 18 | 0.68 | 0.038 | ⊙ | ○ | ○ | △ | C |
| 21 | 440 | 260 | 16 | 0.59 | 0.037 | ⊙ | ○ | ○ | △ | C |
| 22 | 400 | 270 | 19 | 0.68 | 0.036 | ⊙ | ○ | ○ | △ | C |
| 23 | 420 | 260 | 17 | 0.61 | 0.036 | ⊙ | ○ | ○ | △ | C |
| 24 | 400 | 220 | 16 | 0.55 | 0.034 | ⊙ | ○ | ○ | △ | C |
| 25 | 400 | 260 | 20 | 0.65 | 0.033 | ⊙ | ○ | ○ | △ | C |
| 26 | 480 | 340 | 22 | 0.71 | 0.032 | ⊙ | ○ | ○ | △ | C |
| 27 | 450 | 300 | 21 | 0.67 | 0.032 | ⊙ | ○ | ○ | △ | C |
| 28 | 300 | 110 | 20 | 0.37 | 0.019 | ○ | ⊙ | △ | ○ | C |
| 29 | 390 | 170 | 27 | 0.44 | 0.016 | ○ | ⊙ | △ | ○ | C |

TABLE 4

| Symbol | $M_{IF1}$ | $M_{IF2}$ | $\phi$ | $\alpha$ | $\beta$ | 50 mg/cm² white streak elimination | 50 mg/cm² airborne developer | 40 mg/cm² white streak elimination | 40 mg/cm² airborne developer | Overall |
|---|---|---|---|---|---|---|---|---|---|---|
| 30 | 340 | 220 | 17 | 0.65 | 0.038 | ⊙ | ⊙ | ○ | ○ | B |
| 31 | 380 | 220 | 21 | 0.58 | 0.028 | ⊙ | ⊙ | ○ | ○ | B |
| 32 | 320 | 190 | 21 | 0.59 | 0.028 | ⊙ | ⊙ | ○ | ○ | B |
| 33 | 360 | 160 | 18 | 0.44 | 0.024 | ⊙ | ⊙ | ○ | ○ | B |
| 34 | 430 | 220 | 22 | 0.51 | 0.023 | ⊙ | ⊙ | ○ | ○ | B |
| 35 | 410 | 180 | 22 | 0.44 | 0.020 | ⊙ | ⊙ | ○ | ○ | B |
| 36 | 420 | 143 | 17 | 0.34 | 0.020 | ⊙ | ⊙ | ○ | ○ | B |

TABLE 5

| Symbol | $M_{IF1}$ | $M_{IF2}$ | $\phi$ | $\alpha$ | $\beta$ | 50 mg/cm² white streak elimination | 50 mg/cm² airborne developer | 40 mg/cm² white streak elimination | 40 mg/cm² airborne developer | Overall |
|---|---|---|---|---|---|---|---|---|---|---|
| 37 | 420 | 220 | 18 | 0.52 | 0.029 | ⊙ | ⊙ | ○ | ⊙ | A |
| 38 | 300 | 130 | 16 | 0.43 | 0.027 | ⊙ | ⊙ | ○ | ⊙ | A |
| 39 | 420 | 220 | 20 | 0.52 | 0.026 | ⊙ | ⊙ | ○ | ⊙ | A |
| 40 | 400 | 210 | 22 | 0.53 | 0.024 | ⊙ | ⊙ | ○ | ⊙ | A |
| 41 | 400 | 180 | 23 | 0.45 | 0.020 | ⊙ | ⊙ | ○ | ⊙ | A |

As can be understood from the data of Table 1 and FIG. 6, when the inflection point force ratio $\alpha$ ($M_{IF2}/M_{IF1}$) is 0.8 or greater, the developer collected at the first inflection point IF1 is strongly attracted by the magnetic force of the second inflection point IF2 and becomes airborne, and conversely, when the magnetic force variation ratio $\beta$ is less than 0.015, the developer collected at the first inflection point IF1 does not become airborne and move toward the second inflection point IF2, but is broadly spread in the axial direction of the sleeve due to the excessively weak magnetic force of the second inflection point IF2, such that the white streak elimination ability is reduced.

It can be understood from the data of Table 2 and FIG. 6 that when the inflection point force ratio $\alpha$ is less than 0.8 and the magnetic force variation ratio $\beta$ is 0.05 or greater, the results of both white streak elimination and airborne developer elimination were excellent when the amount of transported developer was 50 mg/cm², but airborne developer elimination became somewhat of a problem when the amount of transported developer was 40 mg/cm².

The data of Table 3 and FIG. 6 show that when inflection point force ratio α is less than 0.8 and the magnetic force variation ratio β is such that $0.015 < \beta < 0.05$, the results of both white streak elimination and airborne developer elimination were excellent when the amount of transported developer was 50 mg/cm², but airborne developer elimination became somewhat of a problem when the amount of transported developer was 40 mg/cm².

The findings shown in Tables 4 and 5 and FIG. 6 indicate that when inflection point force ratio α is less than 0.8 and the magnetic force variation ratio β is such that $0.02 < \beta < 0.03$, the results of both white streak elimination and airborne developer elimination were excellent when the amount of transported developer was 50 mg/cm² and 40 mg/cm².

A comparison of the findings shown in Tables 4 and 5 indicates the experiments shown in Table 5 (Nos. 37~41) provided superior results for airborne developer elimination relative to Table 5 (Nos. 30~36). The distribution curves of the vertical magnetic forces Br of the magnetic members used in the experiments of Table 4 (Nos. 30~36) and the experiments of Table 5 (Nos. 37~41) were compared, and it was found that the maximum and minimum values existed between the first inflection point IF1 and the second inflection point IF2 in the magnetic member of Experiment 4, whereas such maximum and minimum values were not present in the magnetic member of Experiment 5, although the vertical magnetic force Br exhibited a normal reducing trend from the first inflection point IF1 toward the second inflection point IF2. That is, in the experiments of Table 4, it is believed that some developer became airborne traveling from the first inflection point IF1 toward the second inflection point IF2 because the developer was strongly attracted to the maximum peak of vertical magnetic force Br present between the first inflection point IF1 and the second inflection point IF2. The trend of simple reduction in the vertical magnetic force Br appeared also in Nos. 15 and 16 of Table 3, and No. 30 of Table 4. Thus, the ability to eliminate airborne developer in these cases was deemed superior under conditions of identical inflection point force ratio α and magnetic force variation ratio β

In integrating the above described considerations, it is determined that in order to improve white streak elimination and airborne developer elimination, it is necessary to set the inflection point force ratio α ($= M_{IF2}/M_{IF1}$) of the first inflection point IF1 and second inflection point IF2 to 0.8 or less, and set the magnetic force variation ratio β ($= \alpha/\Phi$) at less than 0.015. It is further determined that in order to prevent white streaks and airborne developer to within tolerable limits without altering the amount of transported developer, the magnetic force variation ratio should preferably be set within a range $0.015 < \beta < 0.05$, and ideally within a range $0.02 \leq \beta \leq 0.03$. In order to completely eliminate white streaks and airborne developer, it is desirable that the distribution curve of the vertical magnetic force Br from the first inflection point IF1 to the second inflection point IF2 have no extreme values.

Figure 7:
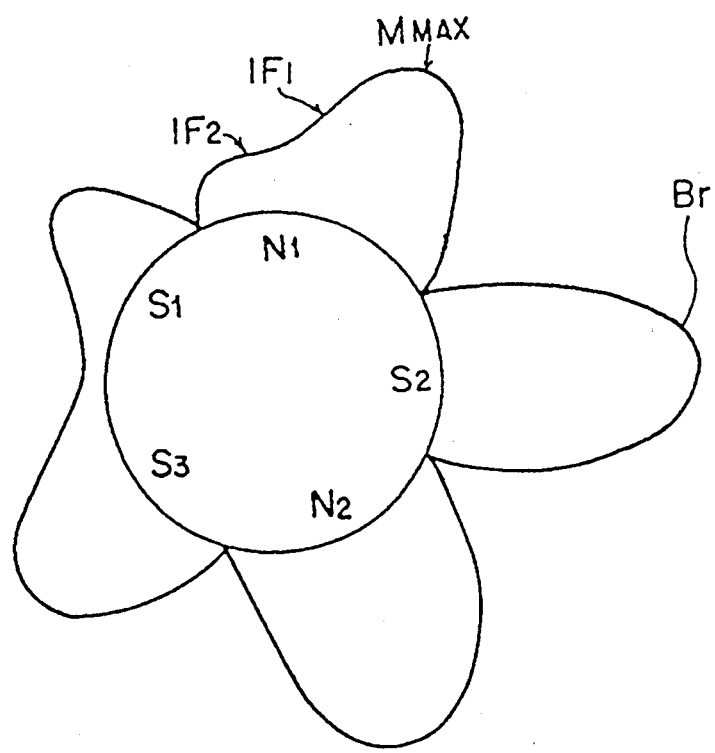
FIG. 7 is an illustration showing the distribution of vertical magnetic force on the sleeve having two inflection points on the upstream side of the peak magnetic force.

Although the present invention has been described above in terms of the distribution curve of the vertical magnetic force Br at the magnetic pole N1 forming two inflection points IF1 and IF2 on the downstream side of the peak magnetic force $M_{max}$, it is to be understood that said inflection points IF1 and IF2 may be formed on the upstream side of the peak magnetic force $M_{max}$, as shown in FIG. 7. In this case, the developer which travels from the magnetic pole S1 on the upstream side toward the first inflection point IF1 collects and becomes disturbed on the upstream side of the second inflection point IF2, such that the developer in the vicinity of the second inflection point IF2 travels in the axial direction of the sleeve. White streak elimination and airborne developer elimination can be jointly achieved by setting the magnetic forces of the inflection points IF1 and IF2 in accordance with the previously described conditions.

Figure 8:
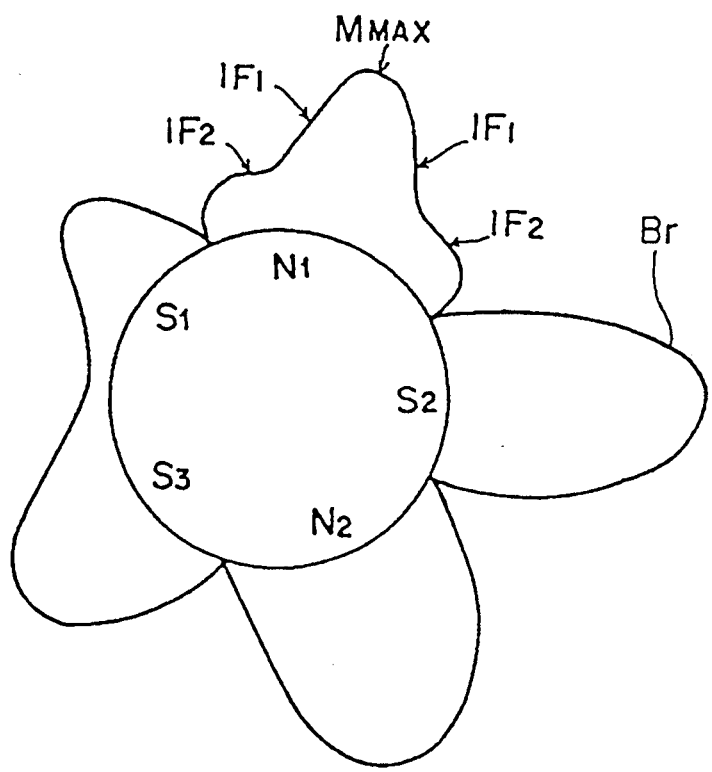
FIG. 8 is an illustration showing the distribution of vertical magnetic force on the sleeve having two sets of inflection points on both sides of the peak magnetic force.
Figure 9:
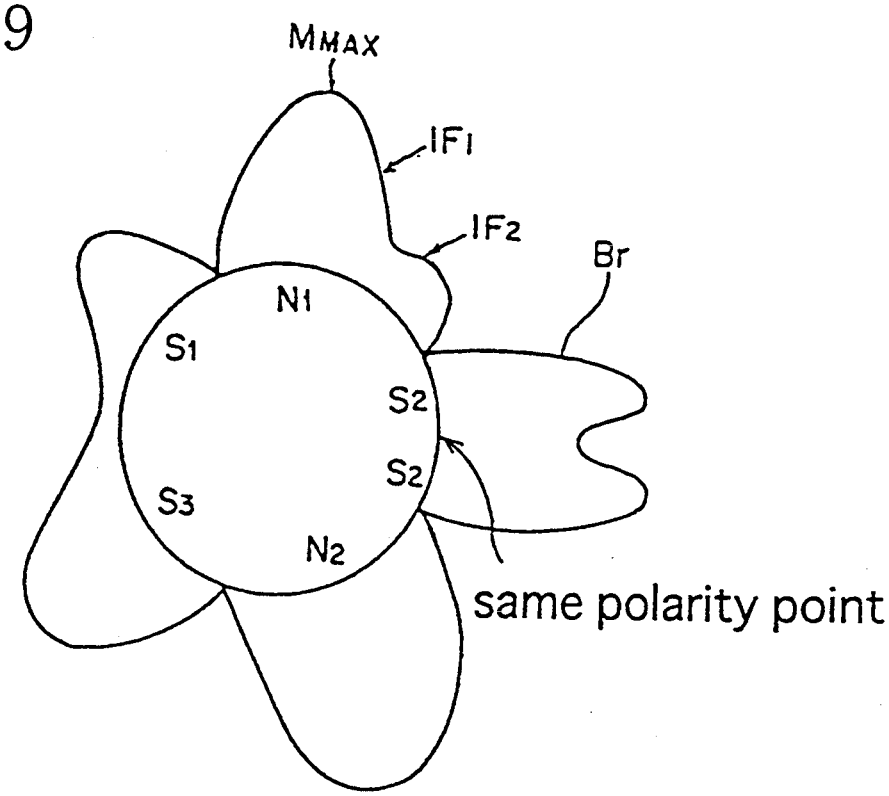
FIG. 9 shows the distribution of vertical magnetic force on the sleeve provided with a homopolar area at the main pole.
Figure 10:
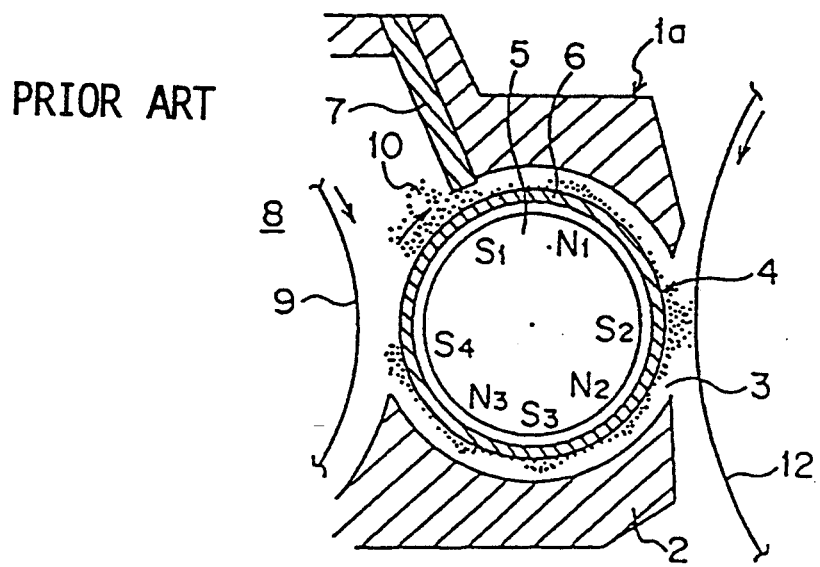
FIG. 10 is a section view showing the main portion of a conventional developing device.
Figure 11:
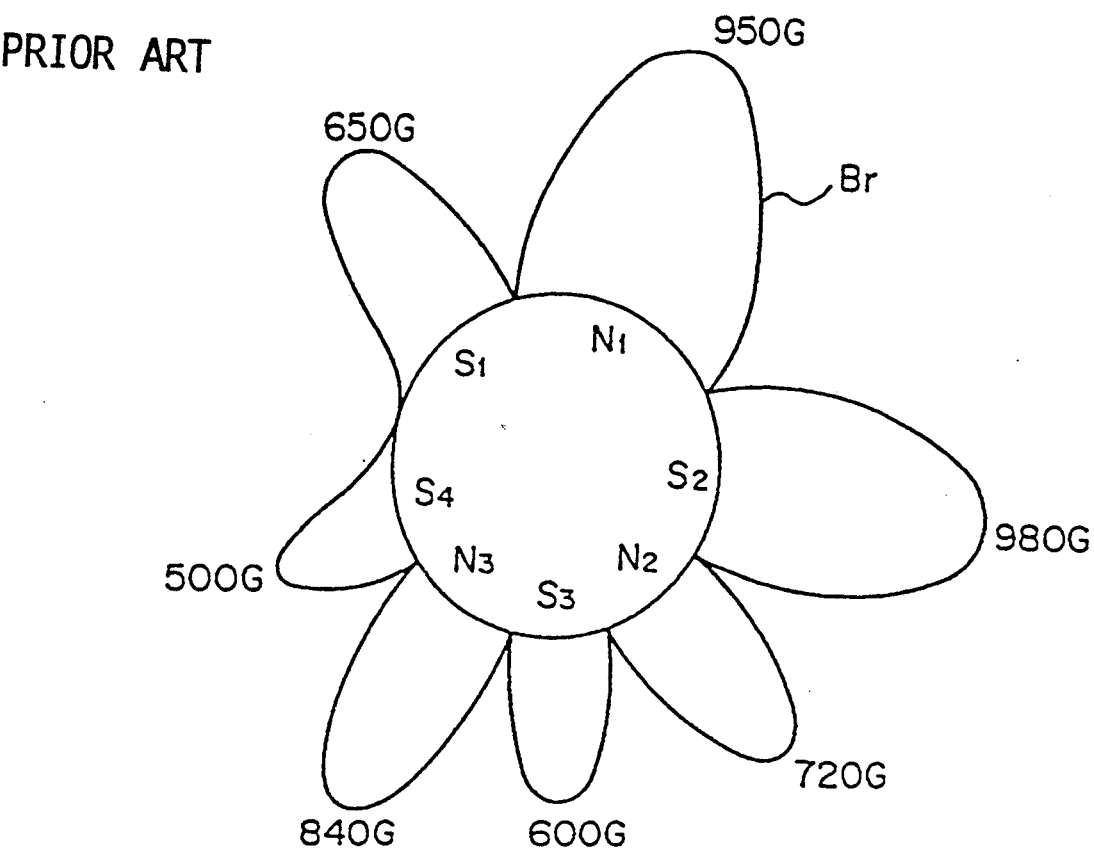
FIG. 11 shows the distribution of vertical magnetic force on the sleeve of the developing device of FIG. 10.
Figure 12:
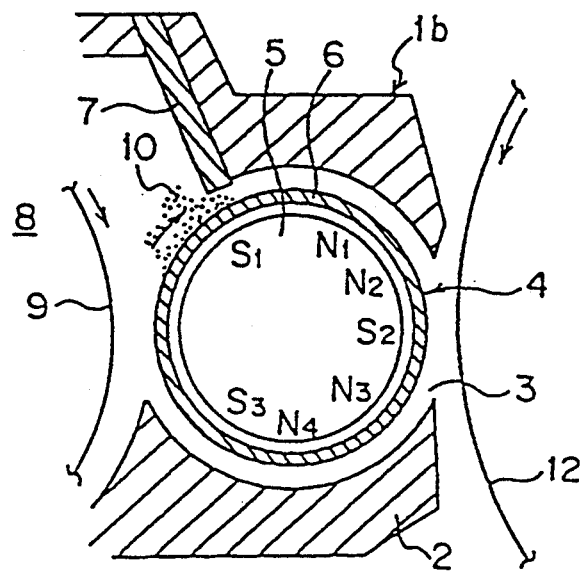
FIG. 12 is a section view showing the main portions of the conventional developing device.
Figure 13:
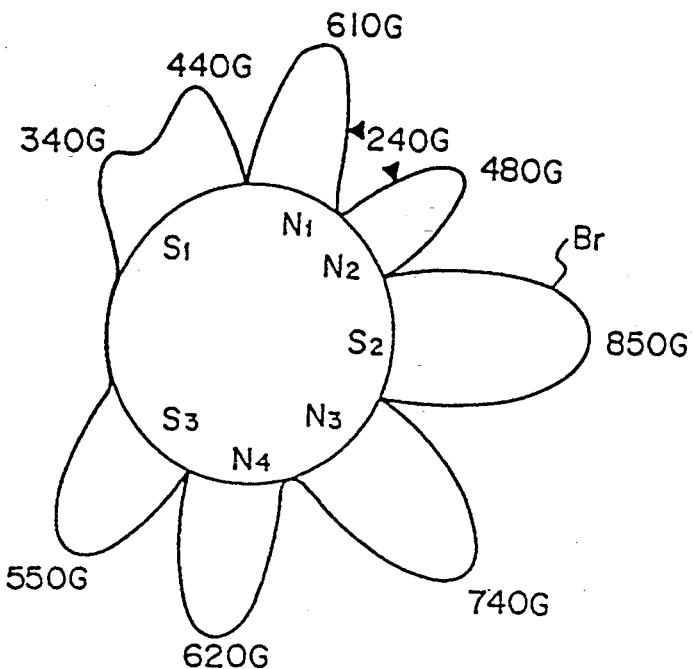
FIG. 13 shows the distribution of vertical magnetic force on the sleeve in the developing device of FIG. 12.
Figure 14:
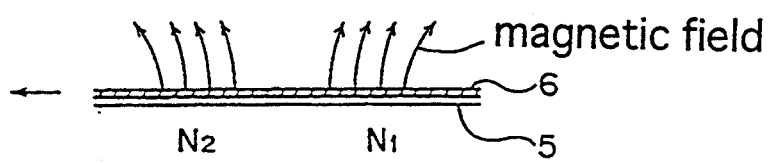
FIG. 14 shows the distribution of vertical magnetic force on the adjacent homopolar areas in the developing device of FIG. 12.
Figure 15:
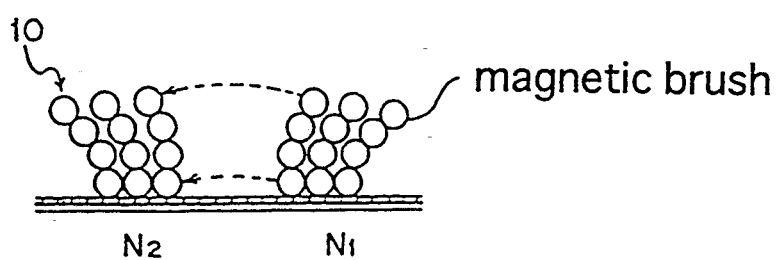
FIG. 15 shows the state of movement of the developer on the adjacent homopolar areas in the developing device of FIG. 12.

As shown in FIG. 8, the inflection points IF1 and IF2 may be respectively set on the upstream side and downstream side of the peak magnetic force $M_{max}$. Furthermore, as shown in FIG. 9, homopolar magnetic poles S1 and S2 may be provided adjacently on the downstream side of the magnetic pole N1 having a distribution curve of vertical magnetic force Br with two inflection points IF1 and IF2, such that the developer maintained on the sleeve by said magnetic poles S1 and S2 is brought into contact with the photosensitive member to accomplish developing.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A developing device comprising:
a movable sleeve confronting an electrostatic latent image carrier at a first point;
a magnet member provided within said sleeve, such that magnetic force produced by said magnet member maintains developer on an external surface of said sleeve, said developer being transported in accordance with movement of said sleeve;
a regulation member confronting the external surface of said sleeve at a second point to regulate a thickness of the developer on the external surface of said sleeve, said second point being upstream of said first point with respect to a direction of developer transportation, and with the distribution curve of vertical magnetic force produced by said magnet member having a peak point in an area between said first and second points, and having first and second inflection points in said area and at a same side of said peak point with respect to the direction of developer transportation, said first inflection point being nearer to said peak point than said second inflection point,
wherein said developing device satisfies the following equations:

$(M_{IF2}/M_{IF1}) < 0.8$ $(M_{IF2}/M_{IF1}) > 0.015\Phi$ wherein $M_{IF1}$ represents a vertical magnetic force at said first inflection point, $M_{IF2}$ represents a vertical magnetic force at a second inflection point, and Φ represents a central angle between said first and second inflection points.

2. The developing device claimed in claim 1, which further satisfies the following equation:

$$0.015\Phi < (M_{IF2}/M_{IF1}) < 0.05\Phi.$$

3. The developing device claimed in claim 2, which further satisfies the following equation:

$$0.02\Phi \leq (M_{IF2}/M_{IF1}) \leq 0.05\Phi$$

4. A developing device comprising:
sleeve means for transforming developer supported thereon, said sleeve means confronting an electrostatic latent image carrier at a first point;
magnetic force generating means for generating magnetic force to keep the developer on said sleeve means;
regulating means for regulating a thickness of the developer on said sleeve means, said regulating means confronting said sleeve means at a second point that is upstream of said first point with resect to a direction of developer transportation, with the distribution curve of vertical magnetic force produced by said magnetic force generating means having a peak point in an area between said first and second points, and having first and second inflection points in said area and at a same side of said peak point with respect to the direction of developer transportation, said first inflection point being nearer to said peak point than said second inflection point,
wherein said developing device satisfies the following equations:

$$(M_{IF2}/M_{IF1}) < 0.8$$

$$(M_{IF2}/M_{IF1}) > 0.015\Phi$$

wherein $M_{IF1}$ represents a vertical magnetic force at said first inflection point, $M_{IF2}$ represents a vertical magnetic force at said second inflection point, and $\Phi$ represents a central angle between said first and second inflection points.

5. The developing device claimed in claim 4, which further satisfies the following equation:

$$0.015\ \Phi < (M_{IF2}/M_{IF1}) < 0.05\Phi$$

6. The developing device claimed in claim 5, which further satisfies the following equation:

$$0.02\ \Phi \leq (M_{IF2}/M_{IF1}) \leq 0.05\Phi.$$

7. A developing device comprising:
a movable sleeve confronting and electrostatic latent image carrier at a first point;
a magnet member provided within said sleeve, where the magnetic force produced by said magnet member maintains developer on an external surface of said sleeve, said developer being transported in accordance with movement of said sleeve;
a regulation member confronting the external surface of said sleeve at a second point to regulate a thickness of the developer on the external surface of said sleeve, said second point being upstream of said first point with respect to a direction of developer transportation, with the distribution curve of vertical magnetic force produced by said magnet member having a peak point in an area between said first and second points, and with the gradient of change rate of vertical magnetic force varying, as a distance from said peak point increases, from negative to positive at a first location and from positive to negative at a second location,
wherein said developing device satisfies the following equation:

$$(M_{IF2}/M_{IF1}) < 0.8$$

$$(M_{IF2}/M_{IH1}) > 0.015\ \Phi$$

wherein $M_{IF1}$ represents a vertical magnetic force at said first location, $M_{IF2}$ represents a vertical magnetic force at said second location, and $\Phi$ represents a central angle between said first and second location.

8. The developing device claimed in claim 7, which further satisfies the following equation:

$$0.015\ \Phi < (M_{IF2}/M_{IH1}) < 0.05\Phi.$$

9. The developing device claimed in claim 8, which further satisfies the following equation:

$$0.02\Phi \leq (M_{IF2}/M_{IF1}) \leq 0.05\Phi.$$

* * * * *